United States Patent [19]

Thijssen et al.

[11] Patent Number: 4,475,355
[45] Date of Patent: Oct. 9, 1984

[54] CONTINUOUS PACKED BED WASH COLUMN

[75] Inventors: Henricus A. C. Thijssen, Son; Bernardus G. M. Van der Malen, Hagestein, both of Netherlands

[73] Assignee: Douwe Egberts Koninklijke Tabaksfabriek-Koffiebranderijn-Theehandel B.V., Utrecht, Netherlands

[21] Appl. No.: 418,832

[22] Filed: Sep. 16, 1982

Related U.S. Application Data

[60] Continuation-in-part of Ser. No. 330,592, Dec. 14, 1981, abandoned, which is a division of Ser. No. 46,758, Jun. 9, 1979, abandoned, which is a continuation-in-part of Ser. No. 866,169, Dec. 30, 1977, abandoned.

[30] Foreign Application Priority Data

Jan. 12, 1977 [GB] United Kingdom .................. 1086/77
Jun. 23, 1978 [GB] United Kingdom ............... 27792/78

[51] Int. Cl.³ .............................................. B01D 9/04
[52] U.S. Cl. ......................................... 62/123; 62/544
[58] Field of Search ................. 62/532, 537, 538, 539, 62/540, 541, 542, 123, 544

[56] References Cited

U.S. PATENT DOCUMENTS

| Re. 23,810 | 3/1954 | Schmidt | 62/538 |
| 2,874,199 | 2/1959 | Tarr | 62/538 |
| 2,921,968 | 1/1960 | Green | 62/538 |
| 3,049,889 | 8/1962 | Carfagno | 62/537 |
| 3,117,031 | 1/1964 | Griffiths | 62/542 |
| 3,501,924 | 3/1970 | Ashley | 62/537 |
| 3,992,170 | 11/1976 | Karnofsky | 62/535 |
| 4,332,699 | 1/1982 | Thijssen et al. | 62/542 |

FOREIGN PATENT DOCUMENTS

| 907645 | 10/1962 | United Kingdom . |
| 1005823 | 10/1962 | United Kingdom . |
| 907644 | 10/1962 | United Kingdom . |
| 1111933 | 5/1968 | United Kingdom . |
| 1358800 | 7/1974 | United Kingdom . |
| 1397002 | 1/1975 | United Kingdom . |

*Primary Examiner*—Frank Sever
*Attorney, Agent, or Firm*—Cushman, Darby & Cushman

[57] ABSTRACT

An apparatus for separating the ice crystals contained in a slurry of an aqueous solution and ice crystals from the aqueous solution and washing the ice crystals with an aqueous wash liquid, whereby a packed bed of ice crystals is created which is subjected to a continuous translatory movement, while a washfront is being created within the packed bed of ice crystals between the aqueous solution and the aqueous wash liquid, the aqueous solution and aqueous wash liquid adjacent to the washfront being substantially stagnant, a stable washfront being created lying in a plane perpendicular to the translatory movement of the packed bed of ice crystals.

12 Claims, 5 Drawing Figures

CONTINUOUS PACKED BED WASH COLUMN

This application is a continuation-in-part application of Ser. No. 330,592, filed Dec. 14, 1981 which is a Rule 60 Divisional of Ser. No. 46,758, filed June 9, 1979 which is a continuation-in-part application of Ser. No. 866,169, filed Dec. 30, 1977, now all abandoned.

This invention relates generally to a continuous process and apparatus for separating the ice crystals contained in a slurry of an aqueous solution and ice crystals from said aqueous solution and washing said ice crystals with an aqueous wash liquid. Normally this aqueous wash liquid will be water, but multi stage processes are possible whereby the wash liquid in any particular stage is the aqueous solution withdrawn from a succeeding stage. This kind of slurry occurs in industrial processes whereby either the aqueous solution is recovered as a product and the ice crystals are rejected, or conversely, whereby the ice crystals are recovered as a product and the aqueous solution is rejected. A process of the first kind in the food industry is the freeze concentration of aqueous liquids such as fruit, juices, beer, wine and coffee extract. A process of the second kind is the freeze concentration of sea water to produce fresh water; in this process the brine is rejected and the ice crystals are recovered and melted.

A continuous packed bed wash column is described in U.S. Pat. No. 3,587,859 (Probstein), specifically for producing fresh water from sea water. In this wash column a porous bed of particles of ice crystals is formed and the liquid medium brine is caused to flow outwardly from the column at a screened opening positioned intermediate its ends. A wash liquid is introduced at one end of the column to displace the liquid medium from the interstices between the particles as the porous bed moves continuously through the column. Control means are provided to control the relationship among the liquid pressures at the ends of the porous bed and the pressure at such screened opening so as to maximize the rate at which the particles can be removed at the output end of the column.

In operating this kind of apparatus the two main difficulties are freezing of the screen producing breakdown of the operation and losses occuring by the mixing of the aqueous solution between the ice crystals and the wash liquid. These losses are exacerbated by the phenomenon of channeling. This phenomenon entails the formation of "channels" in the bed of ice crystals, thrugh which wash liquid escapes. When e.g. liquid foodstuffs are being concentrated the concentration is partly undone, and in the case of sea water desalination fresh water is lost, as it mingles with the concentrated brine which is being rejected. Moreover wash liquid reaching the screen has the tendency to produce clogging. The wash liquid has a higher freezing point than the concentrated solution. The screen is cooled by this concentrated solution and the wash liquid coming in contact with the screen will freeze and, as said, produce clogging, eventually bringing the process to a halt.

The difficulties associated with freezing up of the screen have been well described in U.S. Pat. Nos. 3,885,399 and 3,992,900 (Campbell, assigned to Avco Corp.). Reference is made specially to column 1, lines 23-57 (U.S. Pat. No. 3,992,900). To avoid this clogging in these patents a two stage process has been proposed using two wash columns as described in U.S. Pat. No. 3,587,859, previously mentioned. U.S. Pat. Nos. 3,885,399 and 3,992,900 are proof to the fact that hitherto there was no solution to the problem of avoiding wash liquid reaching the screen, which among other things boils down to the problem of preventing channeling in the packed bed.

The serious difficulties encountered by channeling and freezing up of the screen are moreover clearly expostulated in a recent study of Gershon Grossman (AICHE Journal, Vol. 22, No. 6, November, 1976, pg. 1033-1042). In order to get a clear picture of these problems and their implications, special reference is made to pg. 1033 and pg. 1034 top.

By practice of the present invention all these difficulties may be mitigated and in specific embodiments eliminated completely, which goes to say to provide a method and apparatus whereby freezing up and channeling may be efficiently avoided and substantially zero loss operation is assured.

For a clear understanding of the inventive concept of the present invention the following discussion is appropriate about the Probstein wash column, mentioned above.

We specifically call attention to FIG. 1 of U.S. Pat. No. 3,587,859 and to FIG. 1 and 2 of the Grossman publication.

The counter washer normally consists of a vertical column with a screen in the middle part of its wall. According to U.S. Pat. No. 3,587,859 (column 1, line 41; column 4, lines 17-18) the ice particles form a plug.

The aqueous concentrate is said to flow up through the lower leg of this plug and out through the screen. The pressure of the aqueous concentrate itself is utilized to provide the driving force for moving the ice particles upward (see U.S. Pat. No. 3,587,859 column 1, lines 44-45), which goes to say that the drag of the concentrate on the plug causes the latter to move up against the friction on the walls and the restraining forces at the top. These restraining forces at the top originate e.g. from the drag of the bed against the wash liquid, and the scraper which is used to disintegrate the plug and feed out the particles created by that disintegration.

Ideally in processes according to this prior art only a small amount of wash liquid should flow down through the upper leg of the ice plug and out through the screen (which incidentally would in itself tend to clog the screen), but the balance is upset as soon as channeling occurs.

The situation as depicted in U.S. Pat. No. 3,587,859 and the publication of Grossman shows a "brine crown" which is in fact the wash front or in other words the interface between the concentrate and the wash liquid - which is strongly curved and also flow lines of the concentrate which are strongly curved. This is unavoidable in the set up according to the prior art at issue. The curvature of the wash front itself and of the flow lines in its neighborhood correlate with differences in the density (porosity) of the packed bed, (when we look at it in a cross section perpendicular to the axis).

In this connection attention should be drawn to the American Re. Ser. No. 23,810 (specifically FIG. 1, and column 2, lines 47-50). Packed ice crystals are pushed through a zone (c) where liquid is being withdrawn, a "transition zone" (b) and a waterice zone (a). In this set-up it is in the transition zone (b) where the curved washfront may be supposed to be formed (if a proper "front" is formed at all). Stabilization of a curved washfront has, however, proved to be difficult. To circumvent these difficulties it has been proposed in U.S. Pat.

No. 2,854,494 to force a pulsating reflux stream of wash liquid through the packed bed of ice crystals. Supposedly a "shake-up" of the transition zone should help to counteract difficulties such as channeling, discussed above.

According to the present invention a sharp and stable washfront is only possible if such measures are taken that this washfront (the interface between the concentrate and the wash liquid) lies in a flat plane, perpendicular to the direction in which the packed bed is moving.

Thus according to the present invention there is provided a process for separating the ice crystals contained in a slurry of an aqueous solution and ice crystals from said aqueous solution and washing said ice crystals with an aqueous wash liquid, whereby a packed bed of ice crystals is created which is subjected to a continuous translatory movement, while a washfront is being created within said bed of ice crystals between said aqueous solution and said aqueous wash liquid, characterized in that said aqueous solution and said aqueous wash liquid adjacent to said washfront are substantially stagnant, and a stable washfront is being created lying in a straight plane perpendicular to said translatory movement of said packed bed of ice crystals.

Generally this will encompass a process for separating the ice crystals contained in a slurry of an aqueous solution and ice crystals from said aqueous solution and washing said ice crystals with an aqueous wash liquid, comprising sequentially the following steps:

(a) continuously introducing said slurry in a first cylindrical zone;

(b) in said first cylindrical zone continuously withdrawing part of said aqueous solution from said slurry, producing a packed bed of ice crystals, and causing said packed bed to adopt a homogeneous porosity throughout its cross section;

(c) causing said packed bed to move continuously through a second cylindrical zone, said second zone containing a stagnant layer of said aqueous solution in a first section and a substantially stagnant layer of wash liquid in a second section, contiguous to said first section, thus creating a washfront between said first and said second section;

(d) continuously disintegrating said continuously advancing packed bed and feeding out the product of that disintegration.

Across the washfront there will be a "jump" in temperature as the aqueous solution between the ice crystals, being more concentrated than the wash liquid, will have a lower temperature than that wash liquid. In the normal case that the wash liquid is water, the temperature will of course be 0° C., so the ice crystals in the aqueous solution will have a temperature below 0° C. In coming into contact with the wash liquid, some wash liquid entering between the ice crystals will freeze, and in doing this generally cement these crystals together. In this way at the washfront a solid porous ice plug is formed. Thus first a thickened slurry has to be created, measures have to be taken to allow for a homogeneous build up of the thickened slurry to a packed bed and measures to impart to it a translatory movement. Most important is that before reaching the washfront ice crystals have been caused to distribute themselves evenly throughout the cross section of the packed bed. In principle it may be possible to use the drag of the flowing aqueous solution to move the packed bed and nevertheless assure a homogeneous build up of this bed arriving at the interface between the aqueous solution and wash liquid, (the washfront). Drag may transport the ice crystals in the zone where the aqueous solution is withdrawn. The ice crystals accumulating there may push others along. At the washfront homogenity may be attained if that washfront is located far enough from the place where the aqueous solution has been withdrawn, notwithstanding the fact that at the place of withdrawal of aqueous solution originally an inhomogeneous build up of the thickened slurry is obtained, e.g. in the case of a wall filter. This thickened and originally inhomogeneous slurry must however have opportunity or be caused to homogenize. It has to be homogeneous taken over its cross section when arriving at the waterfront. This is necessary to avoid radial differences in resistance against liquid flow. If these differences exist, the washfront will not be flat but in some way or another curved.

Another possible set up is the following. The slurry is introduced at the bottom of a vertical cylinder. The bottom is provided with a screen, through which aqueous solution is withdrawn. A stirrer-scraper connected with a shaft through the bottom of the cylinder and actuated by a motor keeps the screen clean and homogenizes the thickened slurry. The slurry may be introduced sideways or through the (hollow) shaft of the stirrer-scraper. Also the screen through which the aqueous solution is withdrawn need not be in the bottom but can be e.g. in the wall of the cylinder near to the bottom. The ice crystals accumulating in the lower part of the cylinder push others up, forming a packed bed. The liquid in the lower part of the cylinder is aqueous solution, the liquid in the upper part wash liquid. The interface between the aqueous solution and the wash liquid is the washfront, this washfront being kept at approximately constant level by adjusting the pressure of the incoming slurry and the pressure of the wash liquid. This may be done in the manner more fully described in the underfollowing.

In the top of the cylinder a scraper may be located to disintegrate the washed out packed bed and feed out the product of this disintegration. This also will be more fully described in the underfollowing. The disintegration may also be accomplished by melting.

In an alternative and preferred arrangement the zone where the aqueous solution is withdrawn from the slurry may contain hollow perforated (screened) vanes attached to a rotatable shaft, through which the aqueous solution is withdrawn. These vanes may be attached to the shaft in such a way that they are freely rotatable around small axles perpendicular to the shaft, which goes to say that they are free to take on a tilt depending on the processual factors at hand, such as the rotational speed of the shaft and the drag of the aqueous solution being withdrawn through these hollow vanes. In this case the vanes do not provide the energy to push the crystals ahead but the moving force resides in the drag of the aqueous solution being withdrawn. The crystals accumulating by the withdrawal of the aqueous solution push others along. If the shaft, to which the screened hollow vanes are attached and freely movable, is not rotated, they will take on a position parallel to the axis of the wash column, pointing to the feed out end, especially if the vanes are screened at both sides. It is however advantageous to rotate the shaft. This will greatly help in counteracting any tendency to the formation of inhomogenities by the passage of the thickened slurry along the screen.

Another preferred measure according to the present invention is the use of mechanical means to impart a translatory ovement to the thickened slurry of ice crystals, and in doing so create a steadily advancing packed bed of these crystals. This may e.g. be accomplished by using tilted vanes, attached to a rotatable shaft, in such a way that they have a fixed tilt. Again the screen to withdraw the aqueous solution may be located in these vanes, if these are hollow. By using mechanical means to move the packed bed, this movement is to a large extent made independent from the pressures of the incoming aqueous solution, the outgoing aqueous solution and the wash liquid and their respective differences. By rotation of the fixed tilted vanes the filtering layer adjacent to the filter will be continuously renewed in such a way that homogenity is assured.

To facilitate a homogeneous build up of the packed bed in radial direction, (which is as already said, particularly important when it reaches the washfront), an annular structure of that bed may be recommendable, especially in the case of large diameters of the wash column and when the withdrawal of aqueous solution from the slurry is accomplished through a screen positioned in the direction of movement of the packed bed (e.g. a filter in the wall of the cylinder). We shall then have to use an apparatus consisting of a cylinder coaxially arranged within another cylinder with larger diameter. The difference in diameter and the distance between the screen and the washfront have to be chosen in such a way that under working conditions the packed bed has a homogeneous build up at the washfront.

This implies that generally when the aqueous solution is withdrawn through a screen in the wall of one or both of the cylinders which define the annular space in which the packed bed is created, this annular space has to be rather narrow, e.b. 2 to 5 cm. It will be clear that withdrawal of the aqueous solution through a screen in the wall of the column will tend to favor the creation of inhomogeneities in the packed bed. This tendency is the better counteracted the narrower the annular ring is (in connection with the foregoing we refer to the American patent application Ser. No. 866,169, filed Dec. 30, 1977).

In the case that the aqueous solution is withdrawn through a screen more or less perpendicular to the translatory movement of the packed bed (as already described) the annulus may be considerably wider. E.g. when we use tilted vanes and the inside diameter of the outer cylinder is 100 cm, the annulus may be 20 cm wide. The tendency for an inhomogeneous build up of the packed bed is much less.

In using an annular structure for the packed bed, the mechanical means (such as tilted vanes), used to impart a translatory movement to the packed bed, in the direction of the axis of the cylinder wash column, and scraper means used to disintegrate the packed bed after this has passed through the washfront, may be attached to the inner cylinder. In this case the inner cylinder has to rotate.

It is also possible to have the inner cylinder stand still. In this case the mechanical means to forward the packed bed, and the scraper means (if applied) have to be actuated separately. This will be described in more detail in an underfollowing example. The inner cylinder may however also be attached to the same shaft as the mechanical means to forward the packed bed. An optimal possibility of process control may, as the case may be, be obtained by providing the inner cylinder, the mechanical forwarding means and the scraper means with separate actuating mechanisms, so that their respective rotational speeds can be varied at will.

When using the tilted vanes as the mechanical means to propel the packed bed along it may also be advantageous to make the tilt of these vanes adjustable. This enhances the possibility to control the process, as may be dictated by the particular circumstances at hand.

Disintegration of the packed bed of ice crystals after passing the washfront, may be accomplished by melting. Particularly good results have however been obtained by the use of scrapers. Scrapers for this purpose are in themselves known. Reference is made e.g. to U.S. Pat. No. 3,872,009 and in the underfollowing example a somewhat different construction will be described. As already mentioned the restraining force counteracting the translatory movement of the bed of ice crystals will generally pack the bed so firmly that under influence of the temperature jump at the washfront the ice crystals will be cemented together, creating a solid porous ice plug. It has been found in several instances that this ice plug will consist of about two thirds of solid ice and of about one third of interconnected pores, but this relation may vary according to conditions. The washfront, while actually standing still, moves relative to the packed bed through these pores. In this way the bed is washed "internally". The position of the washfront within the washcolumn may be kept substantially fixed by a sensing device with feedback on the position of that washfront. This may be e.g. accomplished by two closely spaced temperature sensors at different sides of the washfront. This will be described more in detail in the underfollowing.

The present invention also encompasses an apparatus for implementing the process described above. According to the present invention there is thus provided an apparatus for separating the ice crystals contained in a slurry of an aqueous solution and ice crystals, from said solution and washing said ice crystals at a washfront with an aqueous wash liquid, comprising in operative condition:

(a) enclosure means defining a first cylindrical space;

(b) means for feeding in said slurry in said cylindrical space;

(c) means for withdrawing solution from said slurry in said cylindrical space while retaining said ice crystals, producing a thickened slurry;

(d) enclosure means defining a second cylindrical space;

(e) means adapted to transfer said thickened slurry from said first cylindrical space to a feed-in side of said second cylindrical space;

(f) means for causing said thickened slurry to move continuously through said second cylindrical space to a feed-out side;

(g) means for maintaining a stagnant layer of said aqueous solution in said second cylindrical space at its feed-out side;

(h) means for causing said thickened slurry to homogenize throughout in radial direction before reaching the washfront, producing a homogeneously packed bed of ice crystals;

(i) at the feed-out end of said second cylindrical space means for continuously disintegrating said packed bed of ice crystals and feed-out the product of distintegration.

The most referred embodiments of the invention comprise those whereby an annular structure of the washcolumn is combined with rotating hollow vanes with a fixed tilt through which the aqueous solution is withdrawn from the slurry and whereby the scraper means at the one side and the tilted vanes at the other side are provided with separate actuating means. Generally this will imply that the scraper means will be given a higher rotational speed than the tilted vanes.

The present invention will now be further described by way of the following Example and with reference to the accompanying drawings, in which.

Figure 1:
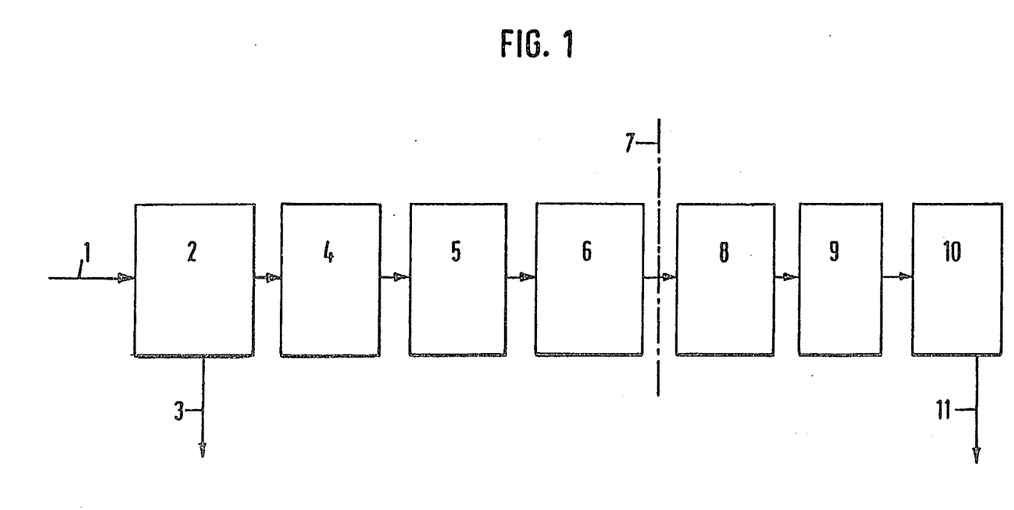
FIG. 1 represents the various processual functions out of which the process according to the invention is composed.

Referring to FIG. 1, at (1) the slurry of ice crystals is supplied, (2) represents the withdrawal of the aqueous solution, which is fed out at (3) leaving a thickened slurry. The function of homogenization is represented by (4), and the function of formation of a packed bed by (5). Movement of the packed bed through a stagnant layer of aqueous solution is represented at (6), arriving at the washfront (7). The bed then moves through the substantially stagnant layer of wash liquid (8), whereby it normally consolidated to a solid porous block ofice, whereafter disintegration is taking place at (9), whereas at (10) the product of disintegration is slushed away and fed out at (11). Some of the functions (2), (4), (5) and (6) may be performed simultaneously in particularly embodiments of the invention, which have been described above. E.g. when using an apparatus with an annular space and hollow vanes with a fixed tile through which the aqueous solution is withdrawn, the functions (2), (4) and (5) may occur practically at the same time.

Speaking most generally however, the important thing is, that when the thickened slurry arrives at the washfront it is homogeneously packed, so as to form a flat, not curved washfront perpendicular to the axis of the wash column.

Figure 2:
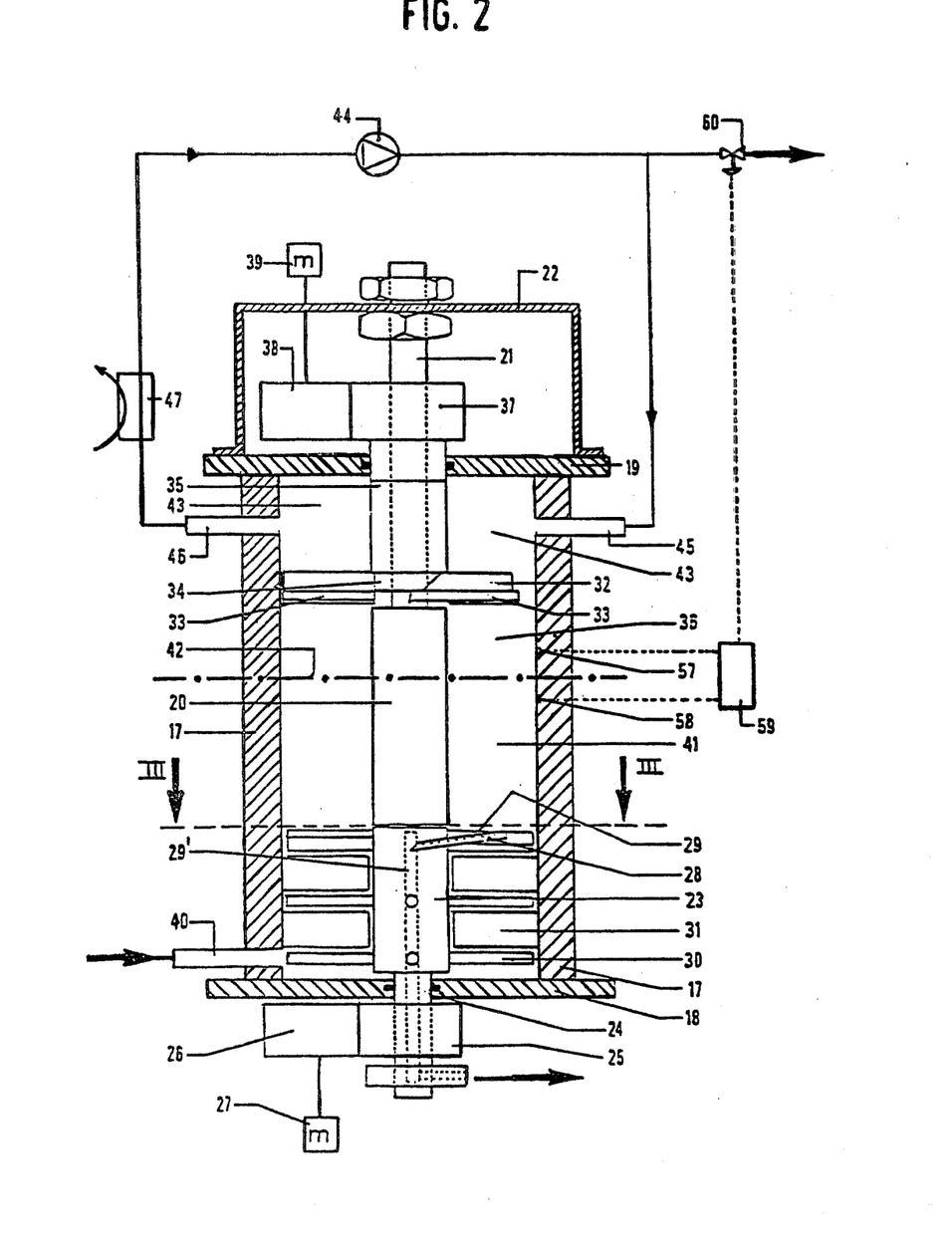
FIG. 2 serves to illustrate one of the preferred embodiments of the invention.

Referring now to FIG. 2, the hull of the apparatus is cut out lengthwise to show the inside in side view. At (17) we see a cylindrical hull, with a bottom plate (18) and a cover plate (19). An inner cylindrical body is shown at (20). This body is attached to a shaft (21), in its turn attached to the strip (22), bolted to the cover plate (19). Another cylindrical body is shown at (23) attached to the shaft (2), carrying the toothed wheel (25). This wheel (25) cooperates with the toothed wheel (26), which is actuated by the motor (27). The body (23) carries the hollow tilted vanes (28), at their upper surface provided with the screen (29). The vanes are represented here more or less simplified, for the rest we refer to FIG. 3 and FIG. 4.

The inside of the hollow vanes (28) communicates with the duct (29') through which liquid can be withdrawn. The body (23) also carries pins (30), while the hull (17) carries vertical vanes (31).

A disc (32) provided with knives (33) and slots (34) acts as a scraper. The disc (32) is attached to the cylindrical body (35), attached to the toothed wheel (37) cooperating with the toothed wheel (38). The motor (39) actuates the toothed wheel (38).

The slurry enters at (40) and is kept well stirred by the pins (30) cooperating with the vanes (31), to prevent settling of the crystals. Aqueous solution is withdrawn through the screen (29) and leaves through the hollow vanes (28) and the duct (29), leaving a thickened slurry at the surface of the screen (29). This thickened slurry is packed and pushed through the annular space (41) by rotation of the body (23) with the vanes (28). The dotted line (42) represents the washfront, being the driving plane between the space (41), in which the liquid is an aqueous solution and the space (36), in which the liquid is wash liquid (normally water). The temperature sensing devices (57) and (58) keep the movement of the waterfront within narrow limits. These will register a certain temperature difference that exists between aqueous solution and the wash liquid. If the washfront moves up or down this temperature difference will disappear and an electric impulse from the control unit (59) will actuate the valve (60) opening or closing it more, as the case may be.

The space (36) will in most cases be filled by a porous solid ice plug, which will be disintegrated by rotation of the disc (32) with the knives (33). The particles created by the disintegration, passing through the slots (34), will enter the space (43). Wash liquid will be pumped around by the pump (44). It will enter the space (43) at (45), flushing out the ice particles at (46). The ice particles are melted by the melter (47). When the washfront remains at a fixed place the quantity of water leaving the system through the valve (60) will equal the quantity of ice which is fed out by the scraper (32). If the washfront moves down the valve (60) is opened somewhat more, so that somewhat more water is withdrawn and visa versa. In this way the balance is restored.

Figure 3:
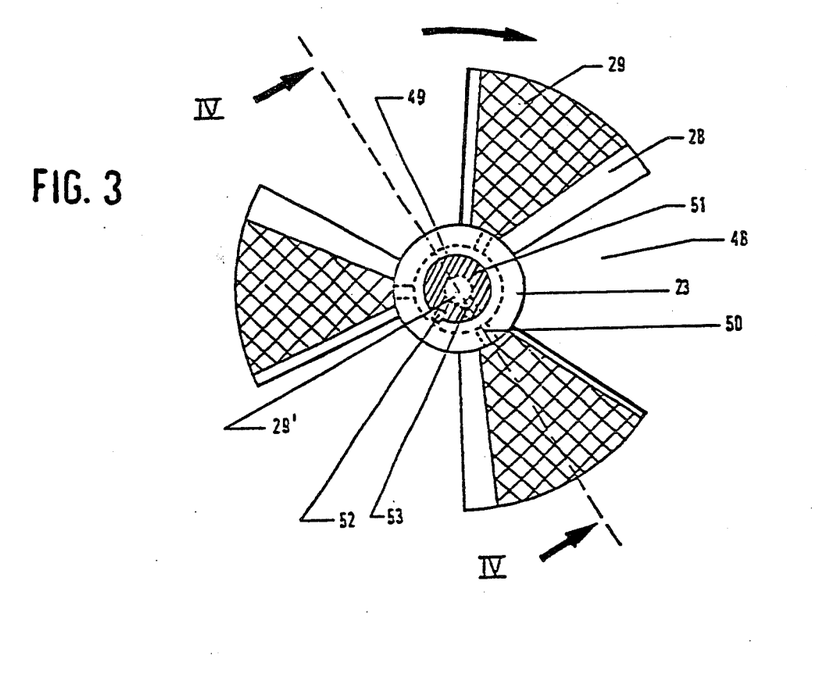
FIG. 3 is a top view of the cross section along III—III in FIG. 2.

In FIG. 3, we see, at (29), the screen of one of the hollow tilted vanes, the edge of which is shown at (28). Between two tilted vanes the space (48) can be detected through which the slurry passes. The vanes are attached to the annular cylindrical body (230); in which a circular groove (49) is present. The inside of the hollow tilted vanes is connected to the circular groove (49) by channels (50). The annular cylindrical body (23) is attached to the shaft (51) by the protruding ridge (52). The shaft (51) is provided with a central channel (29) which is connected to the circular groove (49) by the channel (53).

Figure 4:
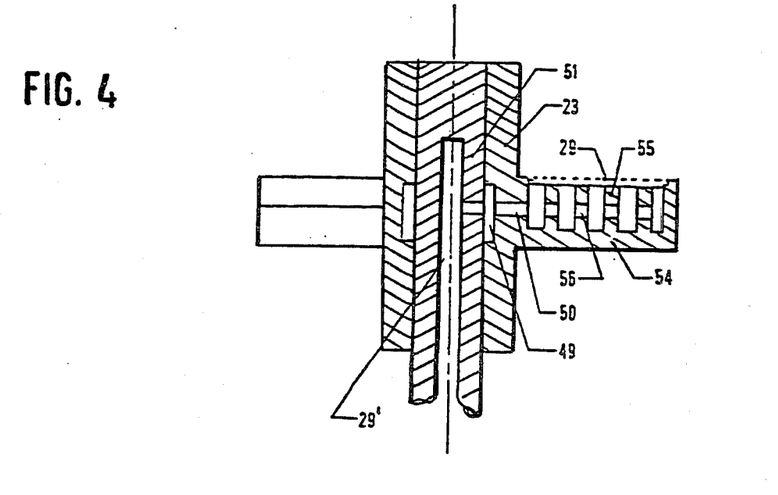
FIG. 4 is a cross section of a hollow vane along IV—IV in FIG. 3.

From FIG. 4 it can be seen that the bottom (54) of the vane is provided lengthwise with ridges (55), which serve to support the screen (29). The ridges (55) are provided with holes (56) for the passage of the aqueous solution. The vane is attached to the cylindrical body (23), provided with the channel (50) and the groove (49) which the liquid of all the vanes is collected. The shaft to which the cylindrical body (23) is attached is shown at (51) with the central channel (29) to drain away the aqueous solution.

Figure 5:
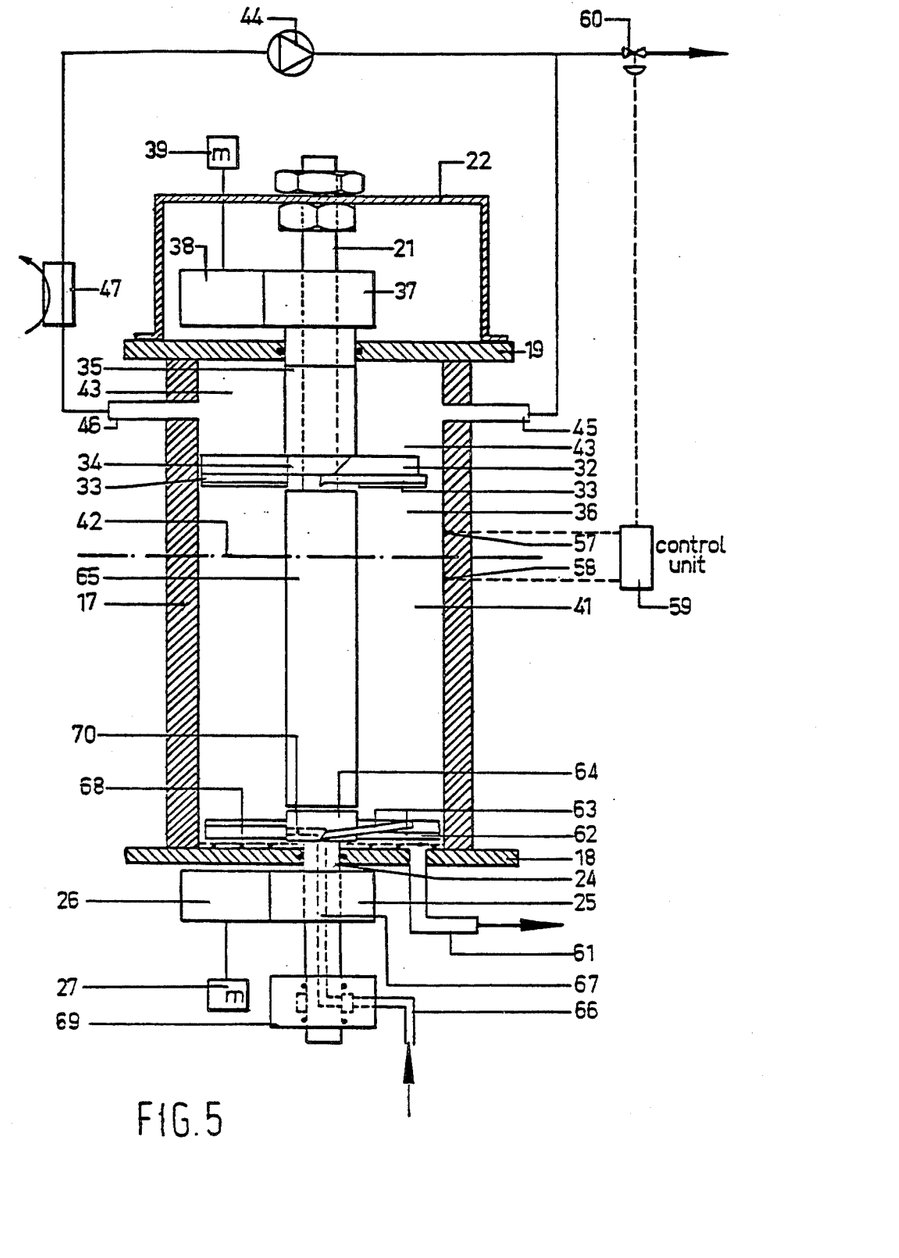
FIG. 5 serves to show an embodiment according to the invention, alternative to that illustrated by the FIGS. 2–4.

In FIG. 5 the upper half of the apparatus shown is of the same construction as the upper half of the apparatus of FIG. 2. The differences reside in the lower half, which will now be described.

The slurry of ice crystals enters through the conduit (66), which is connected to the roto-coupling (69). This in its turn is connected to the channel (67) in the axle (24). This axle is connected to the short axle (64), with a channel (70), discharging in the annular space (41), just above the filter (62), and just below the tilted vanes (63). The solution is withdrawn through the filter (62) and leaves through the conduit (61). The thickened slurry is scraped from the surface of the filter (62) and pushed upwards by the tilted vanes (63). The filter (62) is mounted on supporting rings (68). The thickened slurry being pushed upwards is processed as already described with regard to FIG. 2. The elements (25), (26) and (27) have also already been described above.

It will be obvious that the apparatus as described and other related embodiments with hollow vanes can serve as a continuous slurry thickener when the disintegrating device is left out.

What is claimed is:

1. Apparatus for separating the ice crystals in a slurry of an aqueous solution and ice crystals, from said solution and washing said ice crystals with an aqueous wash liquid, comprising in operative cooperation:
   (a) enclosure means defining a first cylindrical space;
   (b) means for feeding in said slurry in said first cylindrical space;
   (c) means for withdrawing solution from said slurry in said first cylindrical space while retaining said ice crystals, producing a thickened slurry;
   (d) enclosure means defining a second cylindrical space;
   (e) means for substantially eliminating channelling and clogging, by creating a packed bed of ice crystals which is subjected to a continuous translatory movement while a washfront aqueous solution and aqueous wash liquid adjacent to the washfront are substantially stagnant, and by creating a stable washfront lying in a straight plane perpendicular to said translatory movement of said packed bed of ice crystals including means adapted to transfer and for transferring said thickened slurry from said first cylindrical space into said second cylindrical space through one end and moving said bed continuously through said second cylindrical space and out the other end;
   (f) means for maintaining a substantially stagnant layer of said aqueous wash liquid in said second cylindrical space at its feed out side creating a flat, stable washfront between said aqueous solution and said wash liquid perpendicular to the axis of said cylindrical space; and
   (g) at the feed out end of said second cylindrical space, means for continuously disintegrating said packed bed of ice crystals and feeding out the product of disintegration.

2. Apparatus according to claim 1 whereby the means mentioned under (e) for transferring and moving said thickened slurry comprise tilted vanes attached to a rotatable shaft coaxial with said cylindrical spaces.

3. Apparatus according to one of the claims 1 or 2 whereby said cylindrical spaces have an annular structure.

4. Apparatus according to one of the claims 1 or 2 whereby said means for continuously disintegrating said packed bed of ice crystals, mentioned in claim 6 under (g) are scraping means comprising a rotatable disk provided with slots and knives.

5. Apparatus for separating the ice crystals contained in a slurry of an aqueous solution and ice crystals, from said solution and washing said ice crystals with an aqueous wash liquid, comprising in operative cooperation:
   (a) enclosure means defining a first annular space;
   (b) means for feeding in said slurry in said first annular space;
   (c) enclosure means defining a second annular space;
   (d) means for withdrawing solution from said slurry in said first annular space while retaining said ice crystals producing a thickened slurry;
   (e) means for substantially eliminating channelling and clogging, by creating a packed bed of ice crystals which is subjected to a continuous translatory movement while a washfront aqueous solution and aqueous wash liquid adjacent to the washfront are substantially stagnant, and by creating a stable washfront lying in a straight plane perpendicular to said translatory movement of said packed bed of ice crystals including means adapted to transfer and for transferring said thickened slurry from said first annular space into said second annular space through one end and moving said bed continuously through said second cylindrical space and out the other end;
   (f) means for continuously disintegrating said packed bed of ice crystals and feeding out the product of disintegration.

6. Apparatus according to claim 5 whereby the means mentioned under (d) for withdrawing, transferring and moving said thickened slurry comprise tilted vanes attached to a rotatable shaft coaxial with said spaces.

7. Apparatus according to claim 6 whereby each of said vanes is hollow, having an inner space and its surface perforated, said inner space being connected to a duct in said rotatable shaft, in such a way as to enable the withdrawal of solution from said slurry of ice crystals, and feeding it out.

8. Apparatus according to claim 5, whereby the means mentioned under (d) for withdrawing, transferring and moving comprise a filter stretching perpendicularly to the axis of said first annular space across said first annular space and tilted vanes, attached to a rotatable axle, said tilted vanes being situated above said filter and sweeping said filter clean when rotated, and the means for feeding in the slurry, mentioned under (b) has its discharge end above said filter.

9. A continuous wash column for separating the ice crystals in a slurry of an aqueous solution of ice crystals, from said solution and washing said ice crystals with an aqueous wash liquid comprising:
   means for withdrawing solution from said slurry while retaining said ice crystals, producing a thickened slurry of ice crystals,
   enclosure means enclosing first and second coaxial cylindrical spaces,
   means for substantially eliminating channelling and clogging, by creating a packed bed of ice crystals which is subjected to a continuous translatory movement in axial direction while a washfront aqueous solution and aqueous wash liquid adjacent to the washfront are substantially stagnant, and by creating a stable washfront lying in a straight plane perpendicular to said translatory movement of said packed bed of ice crystals including means adapted to transfer and for transferring said thickened slurry from said first cylindrical space into said second cylindrical space against a restraining force through one end of said first space and moving said bed continuously through said second cylindrical space and out the other end;
   means to meet the continuously moving packed bed of ice crystals with its entrapped aqueous solution by a body of aqueous wash liquid substantially stagnantly maintained in said second cylindrical space, such as to create a flat stable washfront between the aqueous solution and the wash liquid perpendicular to the axis of the cylindrical spaces, means to keep said washfront substantially at a fixed place with regard to said enclosure means for said cylindrical spaces including sensing devices at both sides of the washfront, said devices cooperating with means to keep said body of aqueous wash liquid adjacent the washfront substantially stagnant, said sensing devices furthermore being located at a sufficient distance along the path of the continuously moving packed bed of ice crystals to allow said bed to homogenize throughout its cross-section before reaching the washfront, so as to create said washfront as a sharp divisional plane between the aqueous solution and the aqueous wash liquid, said plane being perpendicular to the axis of said cylindrical spaces, means for producing said restraining force including means at the feed out end of said cylindrical space for continuously disintegrating the solid porous ice plug into which the ice crystals of said packed bed are cemented together in passing said washfront, and means for feeding out of the product of disintegration.

10. Apparatus according to claim 9, whereby said means for withdrawing solution from said slurry of ice crystals are located in said first cylindrical space enclosed by said cylindrical enclosure means and a bottom plate, said first cylindrical space being contiguous with a second cylindrical space through which the ice crystals are subjected to a translatory movement against said restraining force, producing a continuously moving packed bed of ice crystals, said first cylindrical space furthermore being provided with means to feed in said slurry of ice crystals, and containing the means for subjecting the ice crystals to a continuous translatory movement through said second cylindrical space.

11. Apparatus according to claim 9, whereby the means for withdrawing solution from said slurry and the means to subject the ice crystals in said thickened slurry to a continuous translatory movement in an axial direction are located within said cylindrical space at the feed in end.

12. Apparatus according to claim 9, whereby the cylindrical space has an annular structure.

* * * * *